United States Patent [19]

Klootwyk

[11] 4,360,577
[45] Nov. 23, 1982

[54] RIB-GRID CATHODE

[75] Inventor: Ronald I. Klootwyk, San Jose, Calif.

[73] Assignee: The Continental Group, Inc., Stamford, Conn.

[21] Appl. No.: 955,566

[22] Filed: Oct. 30, 1978

[51] Int. Cl.$^3$ ............................................. H01M 4/02
[52] U.S. Cl. ...................................... 429/209; 429/72
[58] Field of Search ............................. 429/209, 72–81

[56] References Cited

U.S. PATENT DOCUMENTS

| | | | |
|---|---|---|---|
| 1,417,214 | 5/1922 | Sundby | 429/243 |
| 3,314,821 | 4/1967 | Lambert et al. | 429/209 X |
| 3,871,922 | 3/1975 | Böhm | 429/209 X |
| 4,091,183 | 5/1978 | Niggl | 429/209 X |

*Primary Examiner*—Charles F. LeFevour

[57] ABSTRACT

A cathode for a power module of the type including a consumable electrode. The cathode includes a face plate and a back plate with the face plate having a face surface defined by a plurality of horizontal ribs separated by grooves which function to present an electrolyte under controlled flow conditions to the inner face between the cathode and the anode. The rear surface of the face plate has electrolyte inlet and outlet passages therein extending generally at right angles to the grooves and opening into the grooves in the form of metering slots. The back plate is constructed for communication with inlet and outlet manifolds and provides inlet and outlet passages aligned with like passages in the face plate to effect a constant supply of electrolyte for circulation along the face surface of the face plate, as well as an ample outlet and return arrangement.

10 Claims, 2 Drawing Figures

RIB-GRID CATHODE

This invention relates in general to new and useful improvements in power modules of the type having consumable anodes, and more particularly to the construction of the cathode thereof.

Operable power modules have been developed utilizing consumable anodes formed of lithium and like metal wherein the interface between the consumable face of the anode and the non-consumable face of the cathode is in the form of a screen. Such a screen has a non-controlled open mesh wherein it is extremely difficult to provide uniform electrolyte flow across the face of the anode.

In accordance with this invention, there is provided a cathode in the form of a rib grid plate which is a construction wherein the cathode plate not only provides the desired contact with the anode, but also provides for even distribution of electrolyte across the anode face.

In accordance with this invention, the anode includes a face plate which has a face surface and a rear surface with the face surface being constructed to have a plurality of like horizontally extending ribs for engaging the anode with the ribs being separated by grooves in which the electrolyte flows under controlled conditions to assure the supplying of electrolyte uniformly across the face of the anode.

A particular feature of the face plate is that flow into the grooves which define the electrolyte flow passages is through slots opening into the grooves generally normal to the face of the anode, whereby the electrolyte has a velocity component not only parallel to the anode face across the anode face, but also normal to the anode face, thereby improving power generation performance.

In particular, the face plate, in addition to having the grooves formed across the face surface thereof, is provided with passages formed in the rear face thereof with the passages being generally normal to the grooves and of sufficient depth to intersect the grooves to form slots through which the electrolyte must pass. By controlling the width of the passages, the cross sections of the slots may be controlled to effect a metering of the electrolyte.

A suitable back plate also forms part of the cathode with the back plate being constructed to receive electrolyte from a supply manifold, directing the electrolyte into inlet passages at the rear surface of the face plate, receiving circulated electrolyte from outlet passages in the rear surface of the faceplate, and then directing the circulated electrolyte into a conventional return manifold.

Another feature of the cathode is that the required plating for effecting $H_2O_2$ decomposition can be limited to the tips of the ribs of the face surface of the face plate, thereby minimizing plating cost.

With the above and other objects in view that will hereinafter appear, the nature of the invention will be more clearly understood by reference to the following detailed description, the appended claims, and the several views illustrated in the accompanying drawings.

IN THE DRAWINGS

Figure 1:
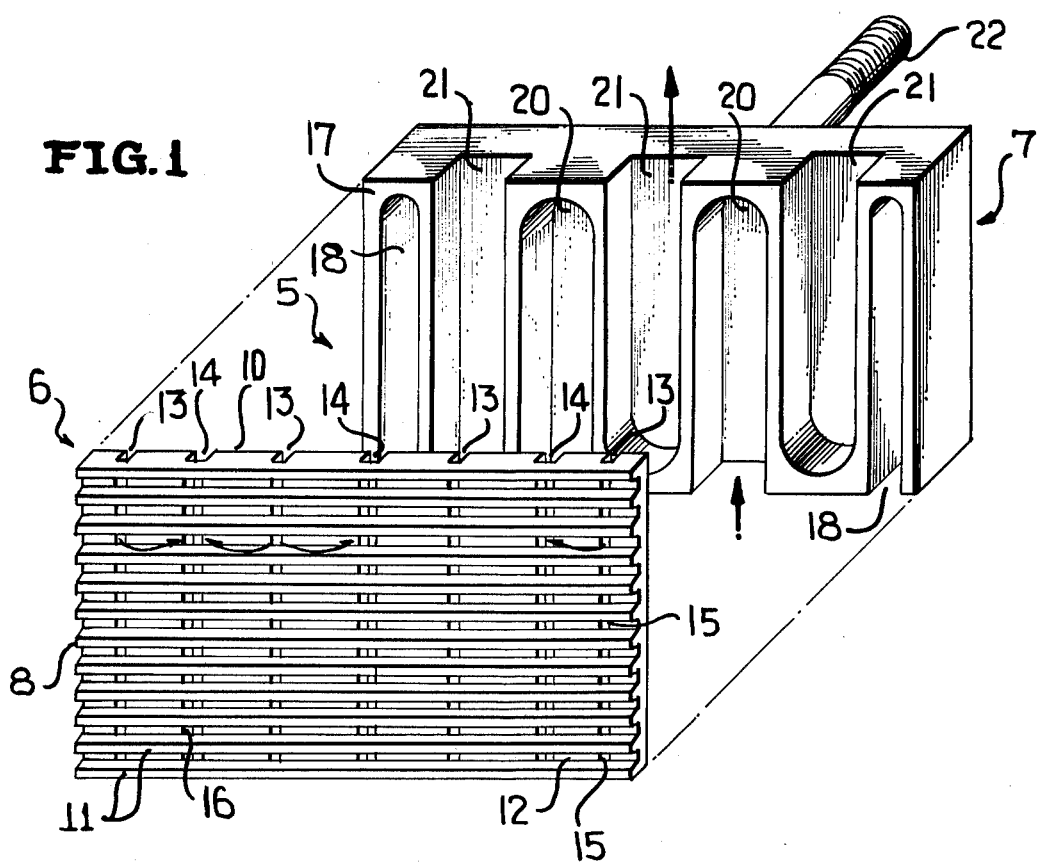
FIG. 1 is an exploded perspective view of the cathode showing the details of both the face plate and the back plate.

Referring now to the drawings in detail, reference is first made to FIG. 1 wherein a two-piece cathode formed in accordance with this invention is illustrated, the cathode being generally identified by the numeral 5 and including a face plate 6 and a back plate 7.

The face plate 6 has a face surface 8 and a rear surface 10. The face surface 8 may be conventionally formed by milling or by a like operation to define a plurality of horizontally extending ribs 11 separated by horizontally extending grooves 12. The cross section of the ribs 11 may be varied as desired, it being required that the ribs 11 have edges which engage the associated anode to effect a constant contact therewith. In a like manner, the cross section of the grooves 12 will be in part controlled by the cross section of the ribs 11 and in part controlled by the spacing of the ribs so as to provide adequate electrolyte flow.

The rear surface 10 is provided with a series of vertical passages, again in the form of machined grooves. These passages include inlet passages 13 and outlet passages 14 which are arranged in alternating relation. The passages 13, 14 are of a sufficient depth in accordance with the thickness of the face plate 6 so that they open into the grooves 12. It will be seen from FIG. 1 that each inlet passage 13 opens into each of the grooves 12 in a slot 15. In a like manner, each of the outlet passages 14 opens into each of the grooves 12 in a slot 16. The width of each slot 15, 16 is directly dependent upon the width of the associated passage 13 or 14, and therefore the cross section of each of the slots 15 and 16 is controlled by selecting the width of the respective passage. Most particularly, the slots 15, which are inlet slots, are of a controlled size so as to effect a metered flow of electrolyte into the grooves 12. The slots 16, which are outlet slots, must, of course, be of sufficient cross section for the effective discharge of electrolyte.

The back plate 7 cooperates with the face plate 6 to provide a constant supply of electrolyte as well as a constant return or discharge path for the circulated electrolyte. The back plate 7 also has a face surface 17 which is engageable with the rear face 10 of the face plate in substantially sealed relation. The face surface 17 has formed therein inlet passages 18 and 20 together with outlet passages 21 in alternating relation. The inlet passages 18, being at the opposite edges of the face plate 6, are narrower in width than the more centrally located inlet passages 20. The inlet passages 18 and 20 are aligned with the inlet passages 13 of the face plate 6, while the outlet passages 21 are aligned with the outlet passages 14. It will be readily apparent that the volumes of the passages 18, 20 and 21 is materially greater than the volume of the associated passages 13 and 14 so that there can be no flow restriction.

It is to be noted that the inlet passages 18, 20 open through the bottom edges of the back plate 7 and extend substantially to the top edge thereof. In a like manner, the outlet passages 21 begin at a point closely adjacent the bottom edge of the back plate 7 and open through the top edge thereof.

When the back plate 7 is a terminal plate, it may be provided with a suitable terminal 22 to which a conductor may be connected.

Figure 2:
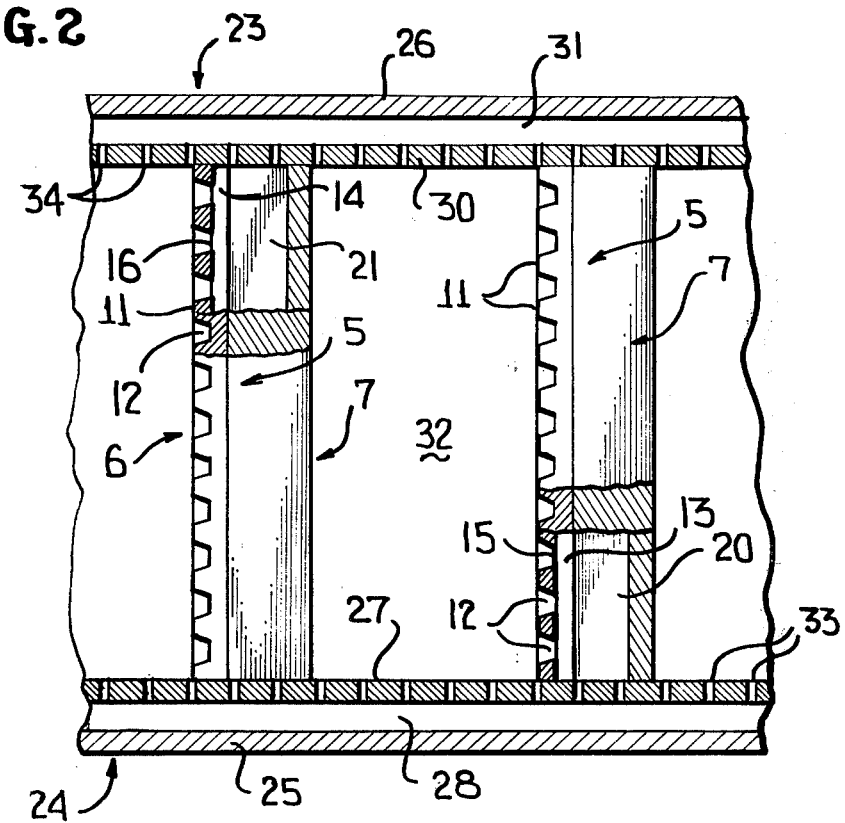
FIG. 2 is an enlarged fragmentary sectional view taken through a power module incorporating the two-piece cathode.

Referring now to FIG. 2, it will be seen that the two-piece cathode 5 is illustrated installed in a power module of a conventional type. The power module is generally identified by the numeral 23 and includes a suitable rectangular housing or case 24 of which a bottom wall 25 and a top wall 26 are illustrated. A lower flow plate 27 is mounted within the case 24 in spaced relation to the bottom wall 25, and together with the bottom wall 25 defines an electrolyte supply or inlet manifold 28. In a like manner, spaced below the top wall 26 and disposed within the case 24 is a flow control plate 30 which together with the top wall 26 defines an outlet or discharge manifold 31 for the electrolyte.

The power module 23 has a plurality of cells each of which includes a cathode 5 and an anode 32. Each anode 32 is formed of a consumable metal, preferably lithium, and has one face thereof engaged with the rear face of an adjacent cathode back plate 7 and another face thereof engaged with the face surface of the face plate 6 of the next adjacent cathode 5. It is to be understood that the stack of the anodes and cathodes is constantly urged toward one end of the case 24 so that a constant predetermined pressure contact is maintained between the anodes and their respective cathodes. Thus the ribs 11 have the tips or faces thereof engaging the consumable face of the respective anode 32. Electrolyte is supplied through the manifold 28 into the inlet passages 18, 20 of a respective back plate 7, the electrolyte flowing through perforations 33 in the flow control plate 27. The electrolyte from the inlet passages 18, 20 flows into the respective ones of the inlet passages 13 through the face plate 6 and into the horizontal grooves 12 where the electrolyte is immediately available to the interfaces between the ribs 11 and the anode 32. It will be apparent from FIG. 2 that as the electrolyte passes through a metering slot 15 it flows first normal to the face of the anode 32 and then horizontally through the groove and out through a next adjacent outlet passage 14.

Flow from the grooves 12 is through the outlet slot 16 into the outlet passages 14 and then into the outlet passages 21. Flow from the outlet passages 21 into the discharge manifold 31 is through perforations 34 in the flow control plate 30.

It will be readily apparent from the foregoing that the cathode construction provides for not only an adequate supply and flow of electrolyte, but also a controlled even distribution of the electrolyte over the consumable face of the anode.

It is also pointed out here that the tips or contact faces of the ribs 11 are coated with a thin layer of a suitable material for effecting $H_2O_2$ decomposition. It has been found that paladium is a suitable material, and by the specific rib construction of the face plate 6 only the active surfaces, i.e. the tips of the ribs 11, may be plated, thereby reducing the use of the costly plating metal to a minimum.

Although only a preferred embodiment of the cathode has been specifically illustrated and described, minor variations may be made in the cathode without departing from the spirit and scope of the invention as defined by the appended claims.

I claim:

1. A cathode face plate for a power module of the type including a consumable anode, said cathode face plate including a face surface and a rear surface, said face surface substantially in its entirety defining a plurality of adjacent parallel continuous anode contacting ribs having parallel electrolyte circulating path defining grooves therebetween, a plurality of separate parallel inlet and discharge passage means arranged in alternating relation in said rear surface transversely of said grooves for respectively supplying and discharging an electrolyte, the combined depths of said grooves and said passage means being greater than the thickness of said face plate with said passage means intersecting said grooves in flow controlling slots.

2. The cathode face plate of claim 1 wherein said face plate is intended to vertically disposed and when so disposed said grooves are horizontally arranged and said passage means are vertically arranged.

3. The cathode face plate of claim 1 wherein said inlet passage means are of a selected width to control the size of the inlet ones of said slots wherein said inlet slots are metering slots.

4. The cathode face plate of claim 3 wherein said outlet passage means are wider than said inlet passage means to provide outlet slots of a greater width than said inlet slots thereby assuring free return of electrolyte.

5. The cathode face plate of claim 1 wherein face surfaces of said ribs have a coating for facilitating $H_2O_2$ decomposition.

6. The cathode face plate of claim 1 together with a consumable anode in face-to-face engagement with said face surface of said face plate.

7. A cathode for a power module of the type including a consumable anode, said cathode comprising a face plate including a face surface and a rear surface, said face surface defining a plurality of adjacent anode contacting ribs having electrolyte circulating path defining grooves therebetween, and a plurality of inlet and discharge passages in said rear surface transversely of said grooves, the combined depths of said grooves and said passages being greater than the thickness of said face plate with said passages intersecting said grooves in flow controlling slots, a back plate having a front surface in opposing sealed relation to said face plate rear surface, said back plate having inlet and outlet passages aligned with said inlet and outlet passages in said face plate and of a materially greater capacity.

8. The cathode of claim 7 wherein said back plate inlet and outlet passages open through opposite edges of said back plate for communication with inlet and outlet manifolds.

9. A cathode for a power module of the type including a consumable anode, said cathode comprising a face plate including a face surface and a rear surface, said face surface defining a plurality of adjacent anode contacting ribs having electrolyte circulating path defining grooves therebetween, and a plurality of inlet and discharge passages in said rear surface transversely of said grooves, tthe combined depths of said grooves and said passages being greater than the thickness of said face plate with said passages intersecting said grooves in flow controlling slots; a consumable anode in face-to-face engagement with said face surface of said face plate and a back plate having a front surface in opposing sealed relation to said face plate rear surface, said back plate having inlet and outlet passages aligned with said inlet and outlet passages in said face plate and of a materially greater capacity.

10. The cathode of claim 9 together with an electrolyte in said back plate inlet passages flowing into inlet ones of said slots normal to the adjacent face of said anode and then across said anode face.

* * * * *